(12) United States Patent
Yokozawa et al.

(10) Patent No.: US 8,376,529 B2
(45) Date of Patent: Feb. 19, 2013

(54) PRESSURE-REGULATING VALVE AND LIQUID DROPLET EJECTION APPARATUS HAVING THE SAME

(75) Inventors: Toshihiro Yokozawa, Shiojiri (JP); Seiji Kinoshita, Suwa (JP); Takahiro Yamashita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 404 days.

(21) Appl. No.: 12/689,756

(22) Filed: Jan. 19, 2010

(65) Prior Publication Data

US 2010/0214377 A1 Aug. 26, 2010

(30) Foreign Application Priority Data

Feb. 23, 2009 (JP) .................................. 2009-038754

(51) Int. Cl.
*B41J 2/175* (2006.01)
*B41J 2/17* (2006.01)

(52) U.S. Cl. .......................................... 347/85; 347/84

(58) Field of Classification Search .................... 347/84, 347/85
See application file for complete search history.

(56) References Cited

U.S. PATENT DOCUMENTS

| 7,458,663 B2* | 12/2008 | Nakamura | 347/84 |
| 7,559,634 B2* | 7/2009 | Miyazawa | 347/84 |
| 2005/0151804 A1* | 7/2005 | Hayashi et al. | 347/85 |

FOREIGN PATENT DOCUMENTS

JP 2006-163733 A 6/2006

* cited by examiner

*Primary Examiner* — Jannelle M Lebron
(74) *Attorney, Agent, or Firm* — Global IP Counselors, LLP (57) ABSTRACT

An internal wall of a secondary chamber excluding one surface includes a flat wall portion with a secondary-chamber-side opening of the communication flow passage being formed in the center portion thereof; a conforming wall portion with which a diaphragm deformed maximally in the minus direction makes conforming contact, the conforming wall portion being connected to the outside of the flat wall portion and having an outflow opening communicating with an outflow port formed at the bottom of the conforming wall portion; and a flow passage groove extending upward from the flat wall portion to cut into the conforming wall portion.

4 Claims, 11 Drawing Sheets

PRESSURE-REGULATING VALVE AND LIQUID DROPLET EJECTION APPARATUS HAVING THE SAME

CROSS-REFERENCE TO RELATED APPLICATIONS

The entire disclosure of Japanese Patent Application No. 2009-038754, filed Feb. 23, 2009 is expressly incorporated by reference herein.

BACKGROUND

1. Technical Field

The present invention relates to pressure-regulating valve for regulating the pressure of a liquid fed to a primary chamber via an inflow port and feeding the liquid from a secondary chamber via an outflow port; and to a liquid droplet ejection apparatus that is provided with the pressure-regulating valve.

2. Related Art

A known pressure-regulating valve of this type for vacuum-feeding a functional liquid from a functional liquid tank to a functional droplet ejection head is disclosed in Japanese Laid-open Patent Publication No. 2006-163733. This pressure-regulating valve is provided with a flat wall portion in which an opening of a communication flow passage on the side of a secondary chamber is formed in the center portion of the flat wall portion, and a conforming wall portion with which a pressure-receiving membrane deformed maximally in the minus direction makes conforming contact, the conforming wall portion being connected to the outside of the flat wall portion via a step portion, and having an outflow opening communicated with an outflow port formed at the bottom of the conforming wall portion.

A valve body is provided to the primary chamber of the communication flow passage, and a protruding shaft provided to the valve body passes through the communication flow passage and makes contact with the pressure-receiving membrane. When the functional droplet ejection head is driven, and the pressure of the secondary chamber decreases, the pressure-receiving membrane is concavely deformed, and the valve body opens via the shaft. The functional liquid thereby flows into the secondary chamber from the primary chamber, and as the pressure of the secondary chamber increases, the pressure-receiving membrane returns to the original state, and the valve body closes. By repeating this process, the functional liquid is vacuum-fed at a predetermined pressure to the functional droplet ejection head. In this pressure-regulating valve, a groove that extends vertically or in a cross shape is formed so as to extend from the flat wall portion to the conforming wall portion so that the functional liquid flows smoothly from the communication flow passage to the outflow port when the pressure-receiving membrane is deformed maximally in the minus direction.

During initial filling of the pressure-regulating valve described above, the functional liquid is forcibly suctioned from the secondary chamber via the functional droplet ejection head. Specifically, in the state in which the secondary chamber is depressurized to deform the pressure-receiving membrane maximally in the minus direction and open the valve body, and the pressure-receiving membrane is conformed to the conforming wall portion, the liquid flows in from the primary chamber to the secondary chamber via the communication flow passage (secondary-chamber-side opening).

However, the pressure-regulating valve described above has drawbacks in that the functional liquid that has flowed into the secondary chamber from the secondary-chamber-side opening flows downward (shortcuts) via the abovementioned groove toward the outflow port that is connected to the suction source, and does not circulate through the top of the inside of the secondary chamber. When the functional liquid shortcuts in this manner without circulating through the top of the secondary chamber, air lingers in the upper space of the secondary chamber, and pressure regulation by the pressure-regulating valve is adversely affected.

SUMMARY

An object of the present invention is to provide a pressure-regulating valve whereby liquid can be caused to circulate throughout the inside the secondary chamber during initial filling, and to provide a liquid droplet ejection apparatus provided with the pressure-regulating valve.

The pressure-regulating valve of the present invention is a pressure-regulating valve for opening and closing, based on atmospheric pressure, a valve body provided to a communication flow passage via which a primary chamber and a secondary chamber communicate inside a valve housing, with the aid of a pressure-receiving membrane that constitutes one surface of the secondary chamber, for regulating the pressure of a liquid fed to the primary chamber via an inflow port, and for feeding the liquid from the secondary chamber via an outflow port; wherein an internal wall of the secondary chamber excluding the one surface comprises a flat wall portion with a secondary-chamber-side opening of the communication flow passage being formed in the center portion thereof; a conforming wall portion with which the pressure-receiving membrane deformed maximally in the minus direction makes conforming contact, the conforming wall portion being connected to the outside of the flat wall portion and having an outflow opening communicated with the outflow port formed at the bottom of the conforming wall portion; and an extending groove portion extending upward from the flat wall portion to cut into the conforming wall portion.

Preferably, the conforming wall portion comprises an annular flat wall portion in which the outflow opening is formed, the annular flat wall portion being connected to the outside of the flat wall portion via a step portion; and an annular tapered wall portion connected to the outside of the annular flat wall portion; and the extending groove portion extends so as to traverse the annular flat wall portion in the radial direction.

Through these aspects of the present invention, during so-called initial filling of the liquid by forcible suction from the side of the outflow port, the liquid flows into the space along the flat wall portion of the secondary chamber from the secondary-chamber-side opening, and continues to flow upward in the extending groove portion. As the liquid flows into the secondary chamber, the pressure inside the secondary chamber increases, and the pressure balance causes the pressure-receiving membrane to retreat from the upper side where the extending groove portion is present. Specifically, as the liquid proceeds to flow into the secondary chamber, the retreat of the pressure-receiving membrane begins from the upper portion thereof, and the entire pressure-receiving membrane eventually retreats. The flow of liquid into the secondary chamber spreads to the flat wall portion, then spreads to the upper portion via the extending groove portion, and circulates throughout the secondary chamber to then flow into the outflow port. The extending groove portion that extends upward thus causes the liquid that flows into the secondary chamber from the secondary-chamber-side opening to fill from the top of the secondary chamber. The liquid can thereby be made to circulate throughout the secondary chamber. Adverse effects on pressure regulation by the pressure-regulating valve are therefore eliminated.

Preferably, the pressure-receiving membrane comprises a film-shaped membrane body and a pressure-receiving plate concentrically provided over a wide area in the center portion of the membrane body; and the pressure-receiving membrane deformed maximally in the minus direction is provided so that the membrane body makes conforming contact with the annular tapered wall portion, and the pressure-receiving plate makes contact with the annular flat wall portion and covers the flat wall portion.

Through this configuration, the pressure-receiving plate can be formed relatively large, the practical pressure-receiving surface area can be enlarged, and an initial inflow space for the liquid can be formed in the flat wall portion. It is therefore possible to effectively prevent a situation in which the membrane body adheres over a wide area to the internal wall of the secondary chamber, and initial suction of air from the primary chamber is impossible when the pressure-receiving membrane is deformed maximally in the minus direction during initial filling. The liquid can therefore be made to reliably circulate throughout the secondary chamber from the upper portion thereof.

Preferably, the pressure of a functional liquid fed from a functional liquid feeding means via the inflow port is regulated, and the functional liquid is fed to an inkjet-type functional droplet ejection head via the outflow port.

When the functional liquid is fed from the pressure-regulating valve to the functional droplet ejection head in a state in which air is retained inside the secondary chamber, the air (gas) inside the secondary chamber is fed along with the functional liquid. The quantity ejected by the functional droplet ejection head therefore fluctuates, and the functional liquid cannot be ejected with good precision.

Through the configuration described above, since air (gas) is not retained in the secondary chamber, and air (gas) is not entrained in the functional liquid, the functional liquid can be ejected with good precision. It is also possible to prevent the degree of deaeration of the functional liquid in the secondary chamber from decreasing, and to prevent air inside the secondary chamber from flowing to the functional droplet ejection head and causing ejection problems.

The liquid droplet ejection apparatus of the present invention comprises the pressure-regulating valve described above, the functional liquid feeding means, and the functional droplet ejection head, wherein a functional liquid is ejected onto a workpiece and drawing is performed while the functional droplet ejection head is moved relative to the workpiece.

Through this configuration, drawing can be performed with good precision through the use of a pressure-regulating valve whereby a liquid can be ejected from the functional droplet ejection head with good precision.

DETAILED DESCRIPTION OF EXEMPLARY EMBODIMENTS

A liquid droplet ejection apparatus provided with the pressure-regulating valve of the present invention will be described with reference to the accompanying drawings. This liquid droplet ejection apparatus is incorporated into a flat-panel display manufacturing line and uses an inkjet-type functional droplet ejection head into which a specialized ink or luminescent resin liquid is introduced as a functional liquid, and the liquid droplet ejection apparatus forms color filters of a liquid crystal display device or luminescent elements or the like as pixels of an organic EL display. A pressure-regulating valve is provided for enabling the functional liquid to circulate throughout the inside of the secondary chamber particularly during initial filling, and the pressure to the functional droplet ejection head can be regulated with good precision.

Figure 1:
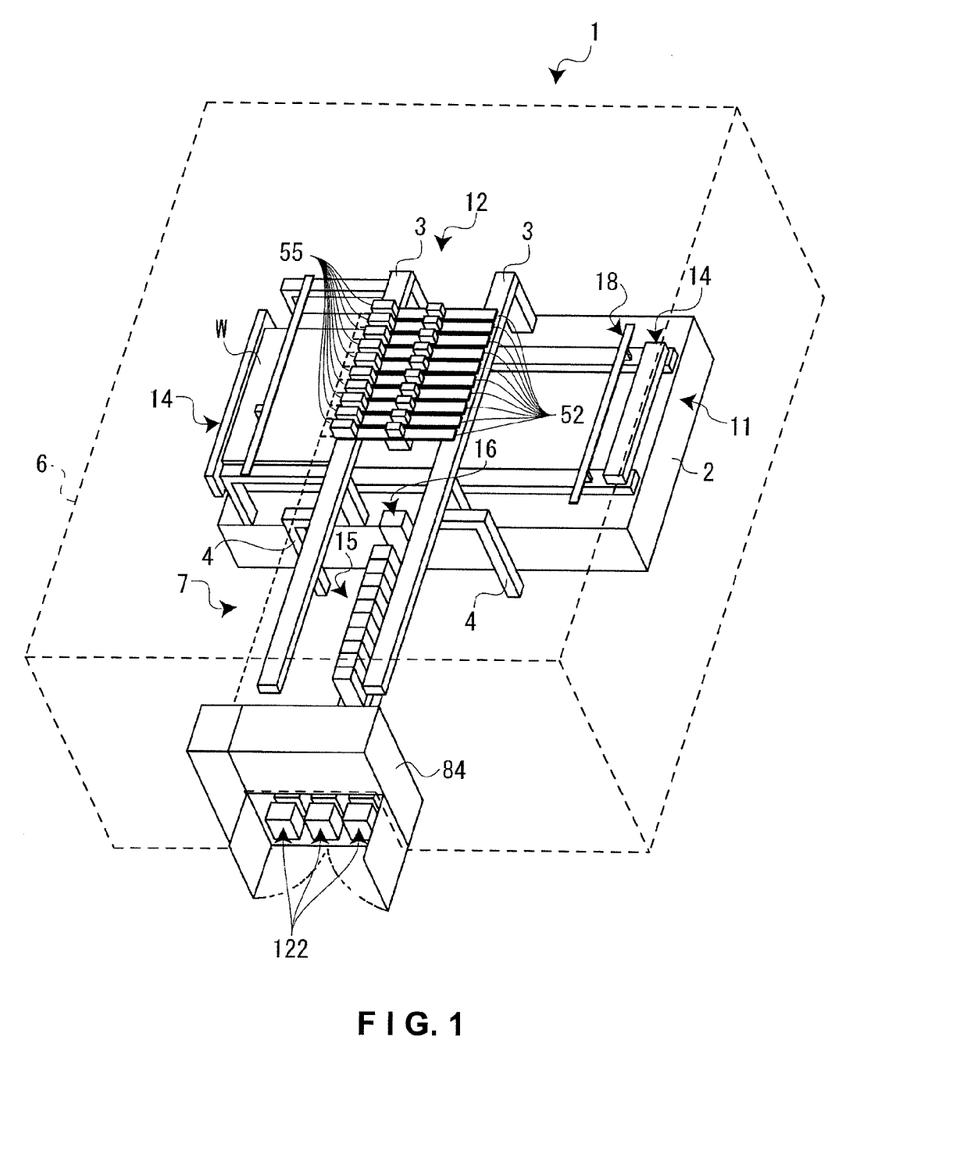
FIG. 1 is a perspective view showing the liquid droplet ejection apparatus according to an embodiment of the present invention.
Figure 2:
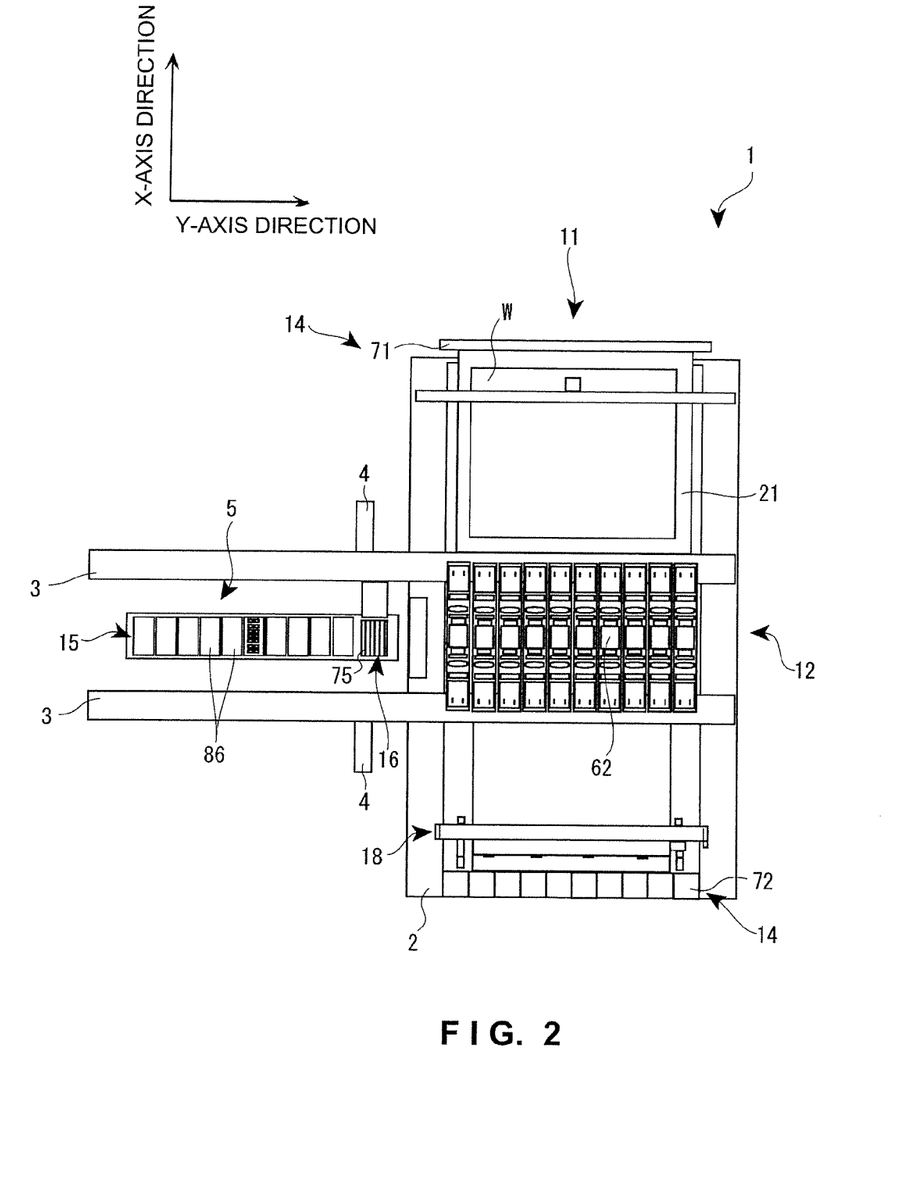
FIG. 2 is a plan view showing the liquid droplet ejection apparatus.
Figure 3:
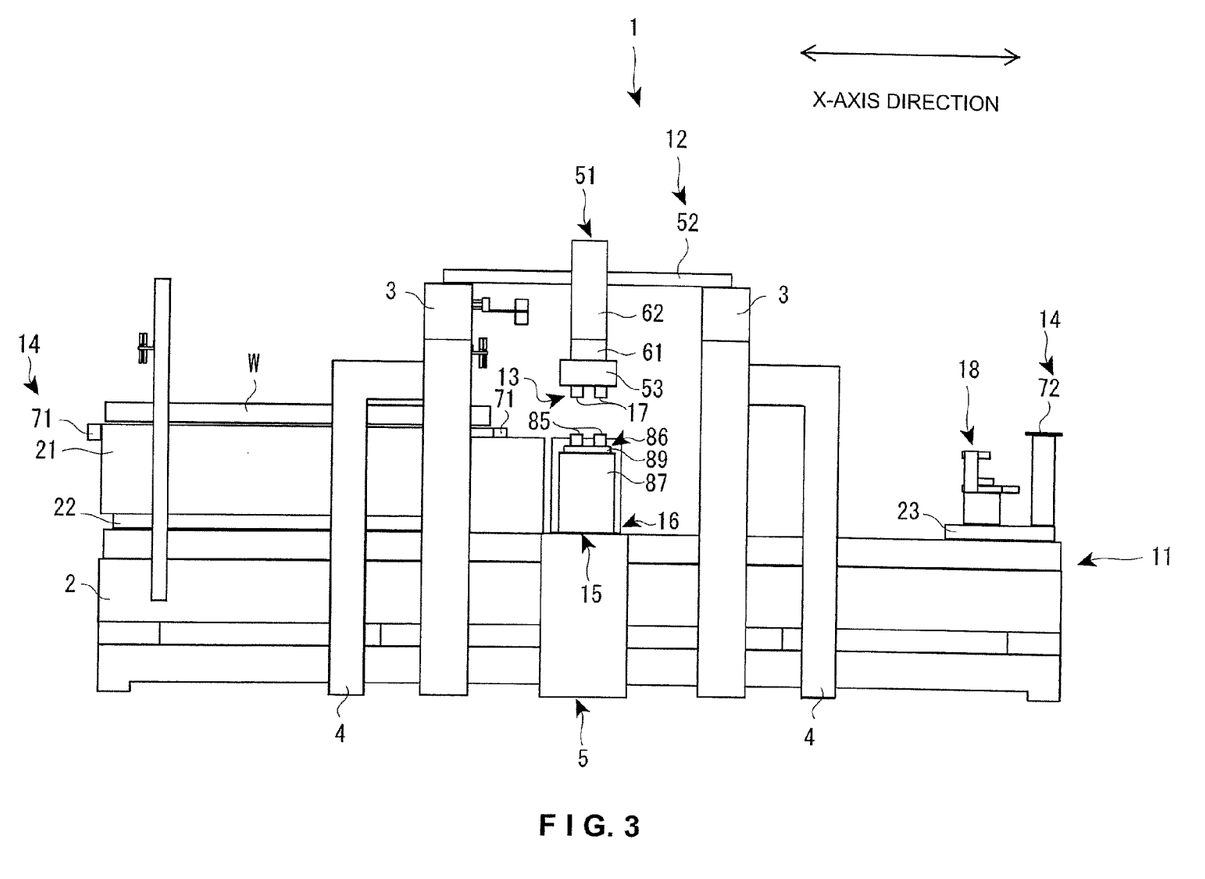
FIG. 3 is a side view showing the liquid droplet ejection apparatus.

As shown in FIGS. 1 through 3, the liquid droplet ejection apparatus 1 is composed of an X-axis table 11 for moving a workpiece W in the X-axis direction (primary scanning direction), the X-axis table 11 extending in the X-axis direction as the primary scanning direction and being provided on an X-axis support base 2 supported by a hard surface; a Y-axis table 12 extending in the Y-axis direction as a secondary scanning direction and being provided on a pair of (two) Y-axis support bases 3 that are suspended over the X-axis table 11 via a plurality of support columns 4; and ten carriage units 51 in which a plurality of functional droplet ejection heads 17 is mounted; and the ten carriage units 51 are suspended by the Y-axis table 12 so as to be able to move. The liquid droplet ejection apparatus 1 is further provided with a chamber 6 for housing the abovementioned devices in a temperature- and humidity-controlled atmosphere, and a functional liquid feeding unit 7 running through the chamber 6 that has three functional liquid feeding devices 101 for feeding functional liquid to the functional droplet ejection heads 17 inside from outside the chamber 6. By driving the ejection of the functional droplet ejection heads 17 synchronously with the driving of the X-axis table 11 and the Y-axis table 12, RGB tricolor functional droplets fed from the functional liquid feeding unit 7 are ejected, and a predetermined drawing pattern is drawn on the workpiece W.

The liquid droplet ejection apparatus 1 is also provided with a maintenance device 5 that has a flushing unit 14, a suction unit 15, a wiping unit 16, and an ejection performance detection unit 18. These units are provided to maintain the functional droplet ejection heads 17 and enable the functioning of the functional droplet ejection heads 17 to be maintained and restored. Among the units constituting the maintenance device 5, the flushing unit 14 and the ejection performance detection unit 18 are mounted on the X-axis table 11, the suction unit 15 and wiping unit 16 extend at a right angle from the X-axis table 11, and are provided on a stand that is provided in a position to which the carriage units 51 can be moved by the Y-axis table 12.

As shown in FIGS. 2 and 3, the X-axis table 11 is provided with a setting table 21 for suction-setting the workpiece W; an X-axis first slider 22 for supporting the setting table 21 so that the setting table 21 is able to slide in the X-axis direction; an X-axis second slider 23 for supporting the abovementioned flushing unit 14 and ejection performance detection unit 18 so as to enable sliding thereof in the X-axis direction; and a pair of left and right X-axis linear motors (not shown) for moving the X-axis first slider 22 and X-axis second slider 23 in the X-axis direction.

The Y-axis table 12 is provided with ten bridge plates 52 from which the ten carriage units 51 are suspended; ten Y-axis sliders (not shown) for supporting the ten bridge plates 52 in straddled fashion; and a pair of Y-axis linear motors (not shown) for moving the bridge plates 52 in the Y-axis direction via the ten Y-axis sliders, the Y-axis linear motors being provided on the pair of Y-axis support bases 3. The Y-axis table 12 secondarily scans the functional droplet ejection heads 17 during drawing via the carriage units 51, and causes the functional droplet ejection heads 17 to face the maintenance device 5 (suction unit 15 and the wiping unit 16). The carriage units 51 may each be moved separately, or the ten carriage units 51 may be moved integrally by controlling the driving of the Y-axis linear motors.

Figure 4:
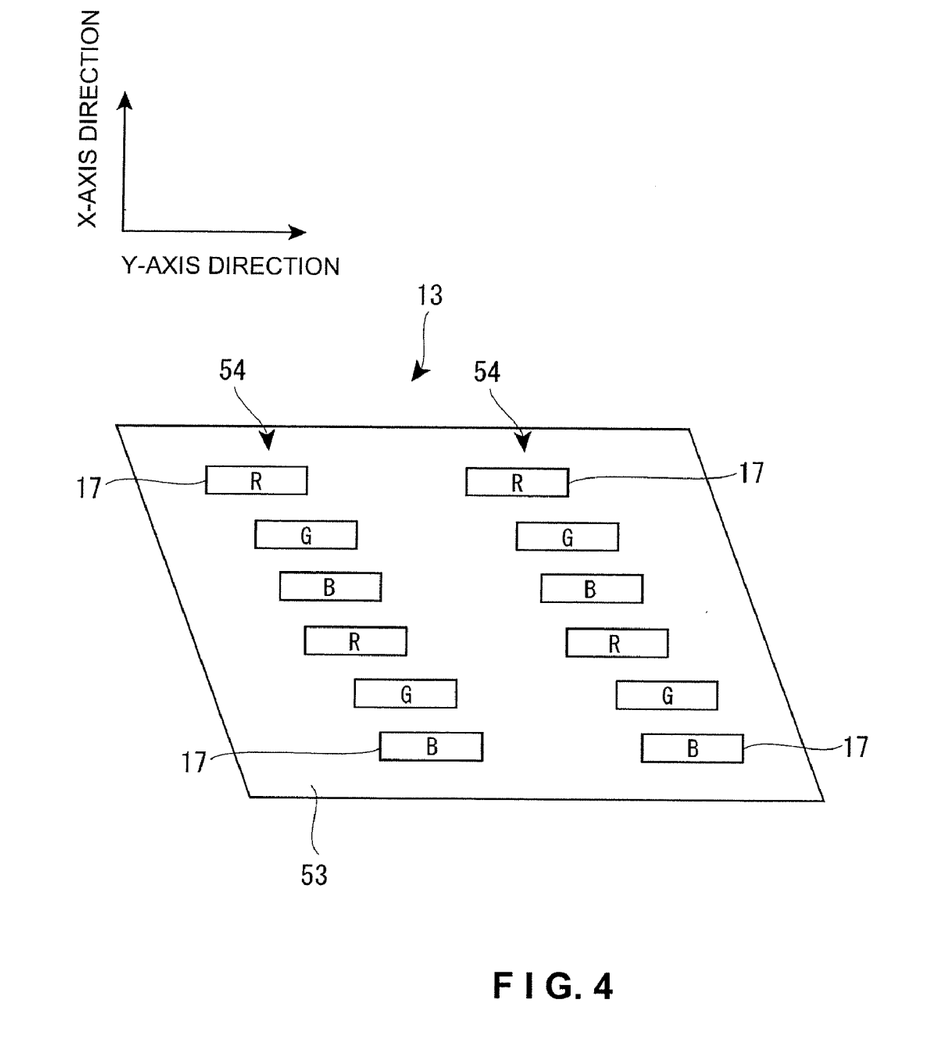
FIG. 4 is a schematic plan view showing the head unit in which the functional droplet ejection heads are mounted.

The carriage units 51 are each provided with a head unit 13 composed of twelve functional droplet ejection heads 17 and a head plate 53 for supporting the twelve functional droplet ejection heads 17 so that the functional droplet ejection heads 17 are divided into head groups 54 of six heads each (see FIG. 4). The carriage units 51 are each provided with a rotation mechanism 61 for supporting the head unit 13 so as to enable θ correction (θ rotation) thereof; and a suspension member 62 for causing the Y-axis table 12 (bridge plates 52) to support the head unit 13 via the θ rotation mechanism 61. Furthermore, sub tanks 121 described hereinafter are provided at the tops of the carriage units 51 (the sub tanks 121 actually being provided inside tank cases 55 on the bridge plates 52).

Figure 5:
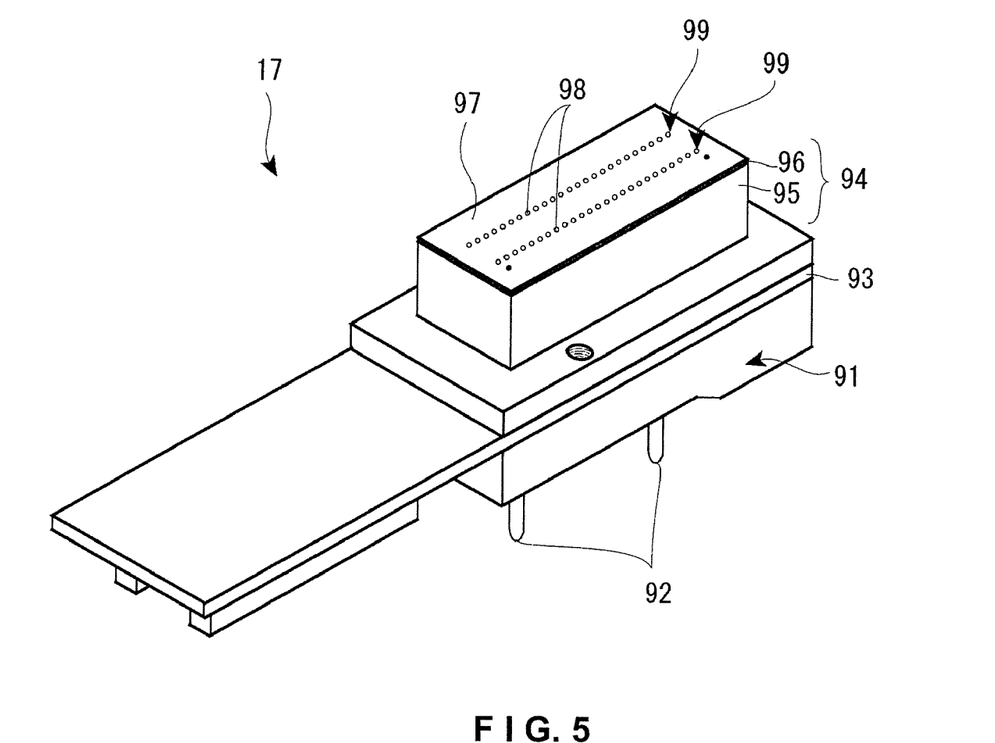
FIG. 5 is an external perspective view showing the functional droplet ejection head.

As shown in FIG. 5, the functional droplet ejection head 17 is a so-called double functional droplet ejection head, and is provided with a functional liquid introduction part 91 having two connecting pins 92; a double head substrate 93 that is connected to the functional liquid introduction part 91; and a head body 94 inside which an intra-head flow passage filled with the functional liquid is formed, the head body 94 being connected to the bottom of the functional liquid introduction part 91. The connecting pins 92 are connected to the functional liquid feeding unit 7 (functional liquid feeding devices 101), and feed functional liquid to the functional liquid introduction part 91. The head body 94 is composed of a cavity 95 (piezoelectric element) and a nozzle plate 96 having a nozzle surface 97 in which numerous ejection nozzles 98 are formed. When the functional droplet ejection head 17 is driven (a voltage is applied to the piezoelectric element), functional droplets are ejected from the ejection nozzles 98 by the pumping action of the cavity 95.

Two nozzle rows 99 composed of numerous ejection nozzles 98 are formed parallel to each other in the nozzle surface 97. The two nozzle rows 99 are arranged at an offset of one-half nozzle pitch.

In the drawing operation of the liquid droplet ejection apparatus 1, a first drawing operation (outward pass) is first performed while the workpiece W is moved in the X-axis direction by the X-axis table 11. The head unit 13 is then moved (secondary scanning) two head widths in the Y-axis direction, and a second drawing operation (return pass) is performed while the workpiece W is again moved in the X-axis direction. The head unit 13 is then scanned two head widths in the secondary direction, and a third drawing operation (outward pass) is performed while the workpiece W is once again moved in the X-axis direction. Drawing in the three colors R, G, and B is efficiently performed by a drawing operation such as described above.

The flushing unit 14 has a pair of pre-draw flushing units 71, 71 and a periodic flushing unit 72, and the flushing unit 14 receives reserve discharge (flushing) of the functional droplet ejection heads 17 that is performed immediately prior to ejection by the functional droplet ejection heads 17, during replacement of the workpiece, and at other times at which drawing is suspended. The suction unit 15 forcibly suctions the functional liquid from the ejection nozzles 98 of the functional droplet ejection heads 17 and serves as a cap for the functional droplet ejection heads 17. The wiping unit 16 has a wiping sheet 75 and wipes a nozzle surface 97 of the functional droplet ejection heads 17 after suction. The ejection performance detection unit 18 inspects the ejection performance (flight deflection and presence of ejection) of the functional droplet ejection heads 17.

As shown in FIGS. 2 and 3, a plurality of head caps 85 is mounted in the suction unit 15, and the suction unit 15 is provided with ten cap units 86 that correspond to the ten carriage units 51; ten elevator mechanisms 87 for raising and lowering the plurality of head caps 85 for each cap unit 86; and ten suction mechanisms 88 (see FIG. 10) for suctioning the plurality of head caps 85 for each cap unit 86. Each of the cap units 86 is composed of twelve head caps 85 that correspond to the twelve functional droplet ejection heads 17, and a cap plate 89 in which twelve head caps 85 are mounted.

The elevator mechanisms 87 raise the twelve head caps 85 in a state in which the carriage units 51 are brought to face the suction unit 15 by the Y-axis table 12, press the head caps 85 against the functional droplet ejection heads 17, lower the twelve head caps 85, and separate the head caps 85 from the functional droplet ejection heads 17. The suction mechanisms 88 are composed of ejectors, pumps, or the like, and are configured so as to be capable of suctioning each of the head caps 85 individually.

The functional liquid feeding unit 7 will next be described with reference to FIGS. 1 and 6. The functional liquid feeding unit 7 is provided with three functional liquid feeding devices 101 for feeding RGB tricolor functional liquid. The three functional liquid feeding devices 101 are connected to functional droplet ejection heads 17 that correspond to the three colors R, G, and B, respectively, and the corresponding colors of functional liquid are thereby fed to the functional droplet ejection heads 17 of each color.

Figure 6:
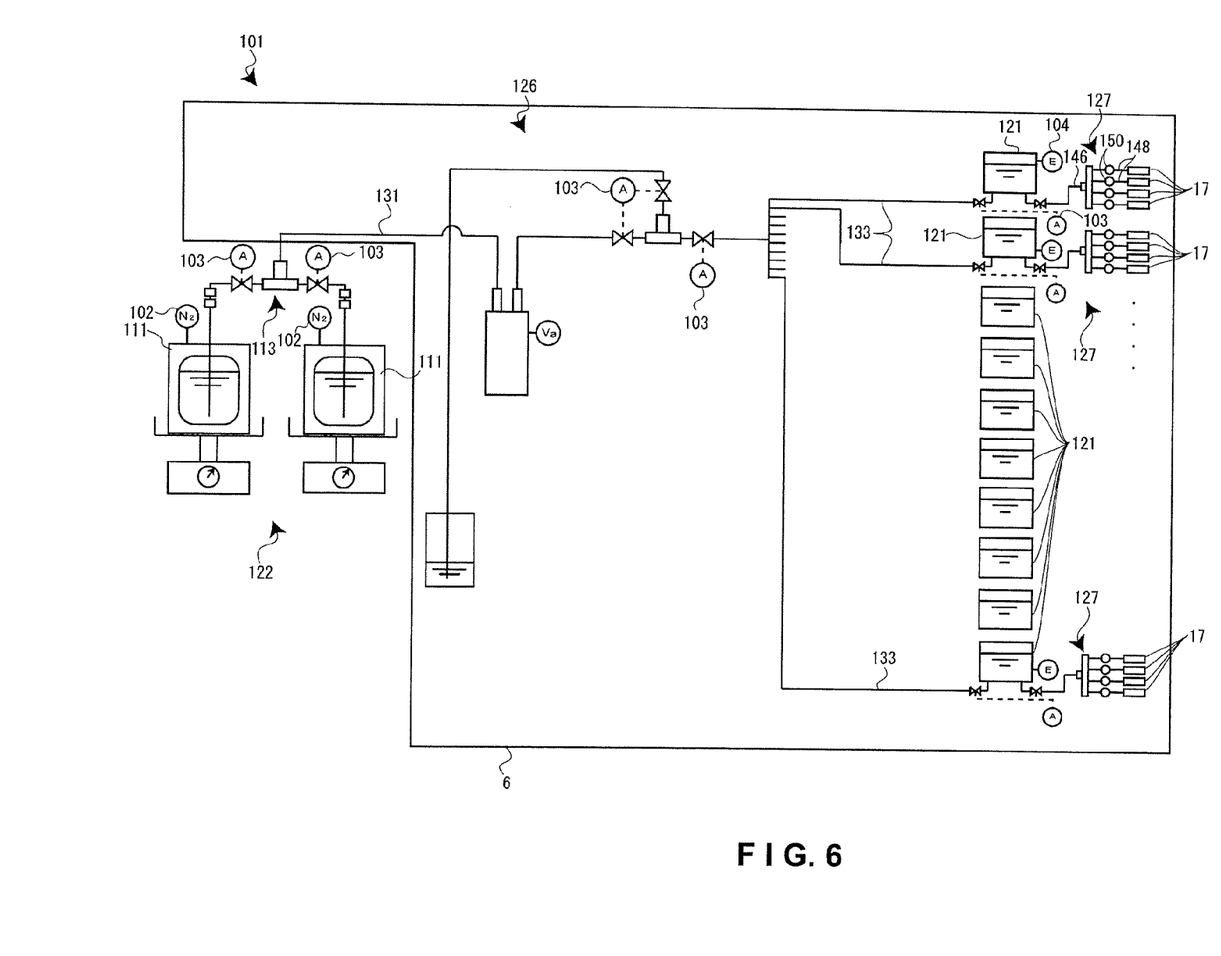
FIG. 6 is a view showing the duct system of the functional liquid feeding device.

As shown in FIG. 6, each of the functional liquid feeding devices 101 is provided with a tank unit 122 having two main tanks 111, 111 that constitute feeding sources for functional liquid; ten sub tanks (functional liquid feeding means) 121 corresponding to the carriage units 51; an upstream functional liquid flow passage 126 for connecting the tank unit 122 and the ten sub tanks 121; and ten downstream functional liquid flow passages 127 for connecting the sub tanks 121 and the functional droplet ejection heads 17.

The functional liquid in each of the main tanks 111, 111 is pressurized by the compressed nitrogen gas from nitrogen gas feeding equipment 102 connected to the main tanks 111, 111, and the functional liquid is selectively fed via the upstream functional liquid flow passage 126 to the ten sub tanks 121.

Various opening and closing valves are controlled by compressed air from compressed air feeding equipment 103 that is connected to the various opening and closing valves. At the same time, the sub tanks 121 are opened to the atmosphere via gas exhaust equipment 104 connected thereto, and the necessary amount of functional liquid is received. The functional liquid of the sub tanks 121 is fed to the functional droplet ejection heads 17 via the downstream functional liquid flow passages 127 by the driving of the connected functional droplet ejection heads 17.

The tank unit 122 is provided with the pair of main tanks 111, 111 as feeding sources of the functional liquid, and a switching mechanism 113 that is connected to the pair of main tanks 111, 111 and connected to the upstream functional liquid flow passage 126. Nitrogen gas feeding equipment 102 is connected to the main tanks 111, 111, and the pressure during force-feeding of the functional liquid can be controlled. The tank unit 122 is housed in a tank cabinet 84 that is provided to a portion of the side wall of the chamber 6.

The upstream functional liquid flow passage 126 is provided with a tank-side main flow passage 131, the upstream side of which is connected to the tank unit 122; and ten branch flow passages 133 that branch in 10 directions from the tank-side main flow passage 131, and the downstream sides of the ten branch flow passages 133 are connected to the sub tanks 121. Each of the downstream functional liquid flow passages 127 is provided with a head-side main flow passage 146, the upstream side of which is connected to a sub tank 121; and four head-side branch flow passages 148 branching in four directions from the head-side main flow passage 146, the downstream sides of the head-side branch flow passages 148 being connected to the functional droplet ejection heads 17. Specifically, functional liquid is fed from the tank unit 122 to 10×4 functional droplet ejection heads 17 by the ten branches of the upstream functional liquid flow passage 126 and the four branches of the downstream functional liquid flow passages 127. Furthermore, since the functional liquid feeding unit 7 has three functional liquid feeding devices 101 corresponding to R, G, and B, functional liquid is fed to 10×12 functional droplet ejection heads 17. A pressure-regulating valve 150 for regulating the feed pressure to each functional droplet ejection head 17 is provided to each of the head-side branch flow passages 148.

Figure 7:
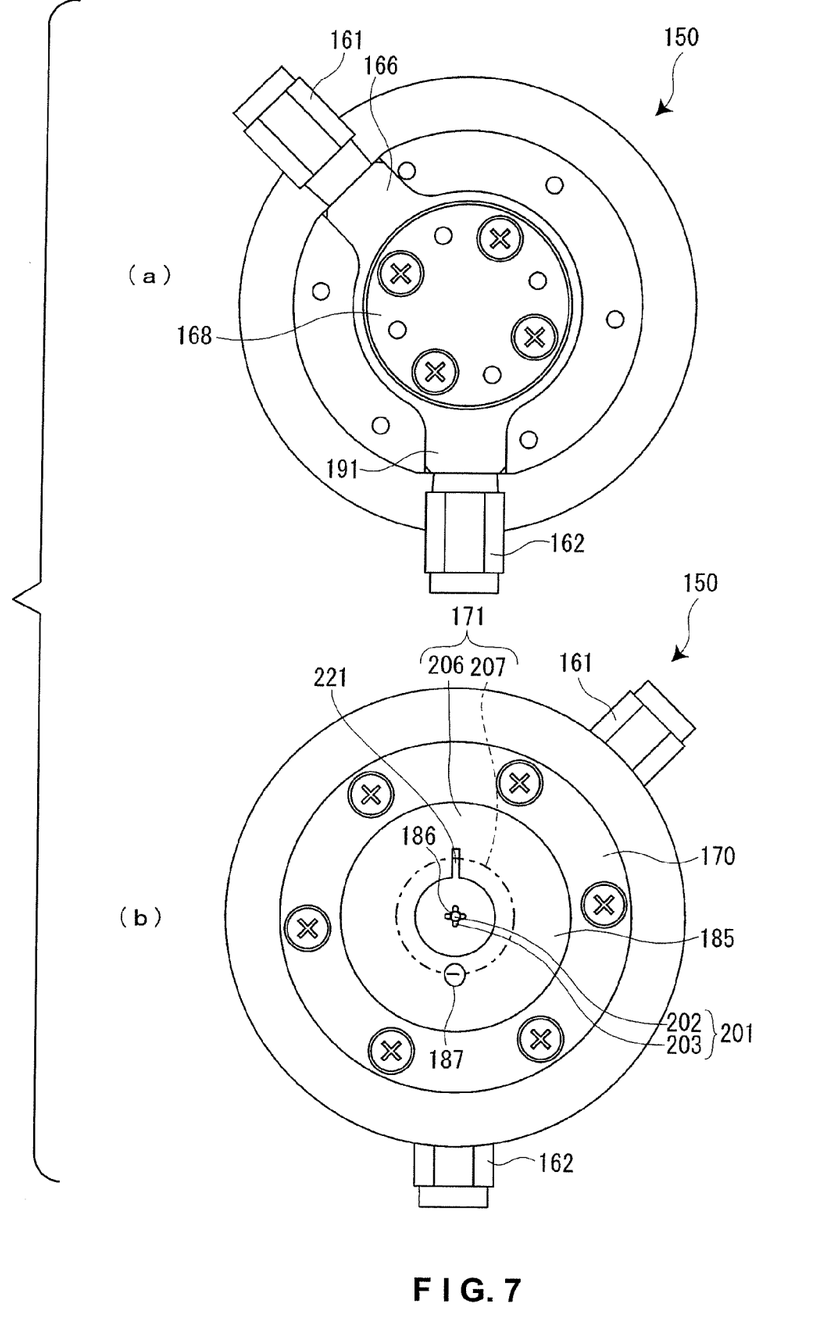
FIG. 7(a) is a back view showing the pressure-regulating valve.
FIG. 7(b) is a front view showing the pressure-regulating valve.

The pressure-regulating valve 150 will next be described with reference to FIGS. 7 through 9. As shown in FIG. 7, the pressure-regulating valve 150 is provided in the head-side branch flow passages 148, and has an inflow connector 161 (union joint) connected to an inflow port 175, the inflow connector 161 constituting an inflow joint, and an outflow connector 162 connected to an outflow port 190 (union joint), the outflow connector 162 constituting an outflow joint. In FIGS. 7 and 9, the top of the pressure-regulating valve 150 is shown at the top of the drawing, and the bottom of the pressure-regulating valve 150 is shown at the bottom of the drawing. Specifically, the pressure-regulating valve 150 is oriented so that the side on which the inflow connector 161 is provided is the top of the pressure-regulating valve 150, and the side on which the outflow connector 162 is provided is the bottom of the pressure-regulating valve 150.

Figure 8:
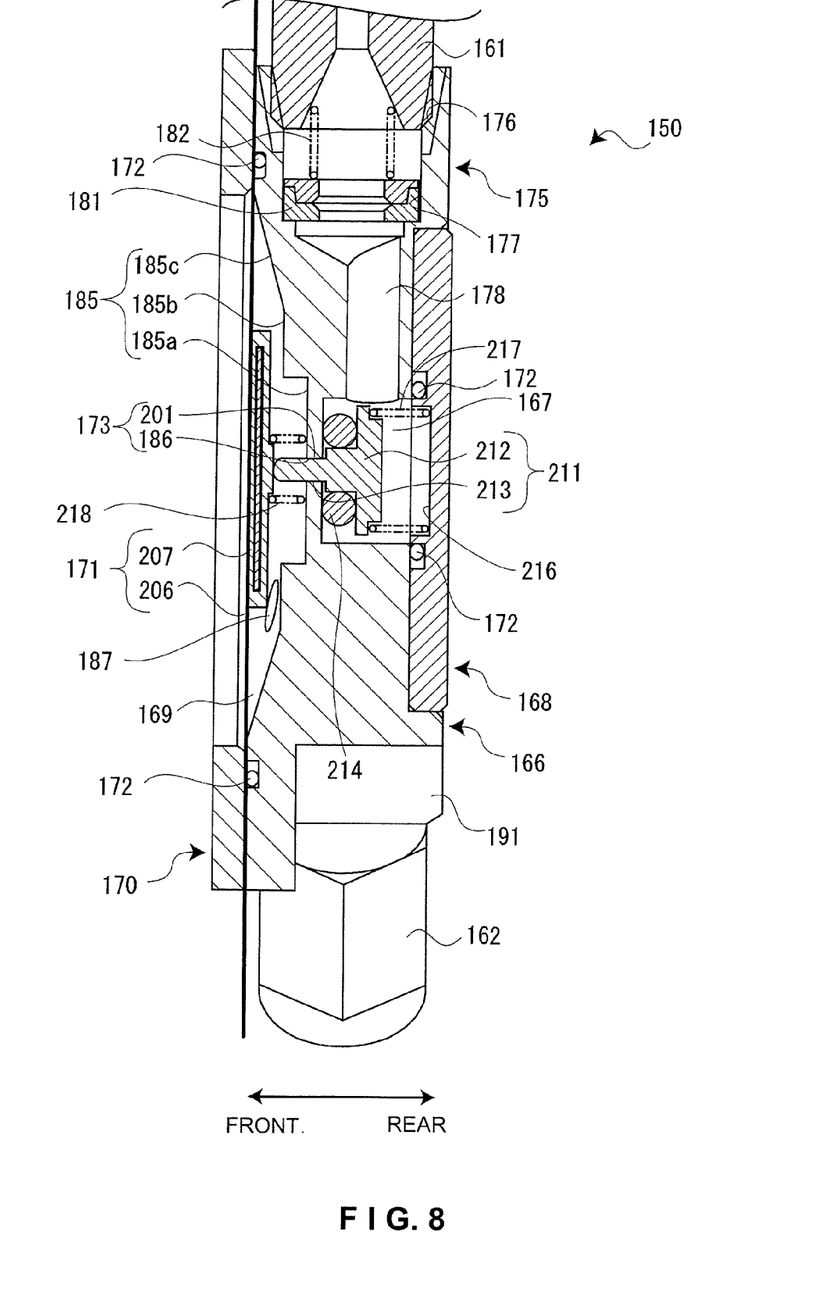
FIG. 8 is a longitudinal sectional view showing the pressure-regulating valve cut in the axial direction of the inflow port.
Figure 9:
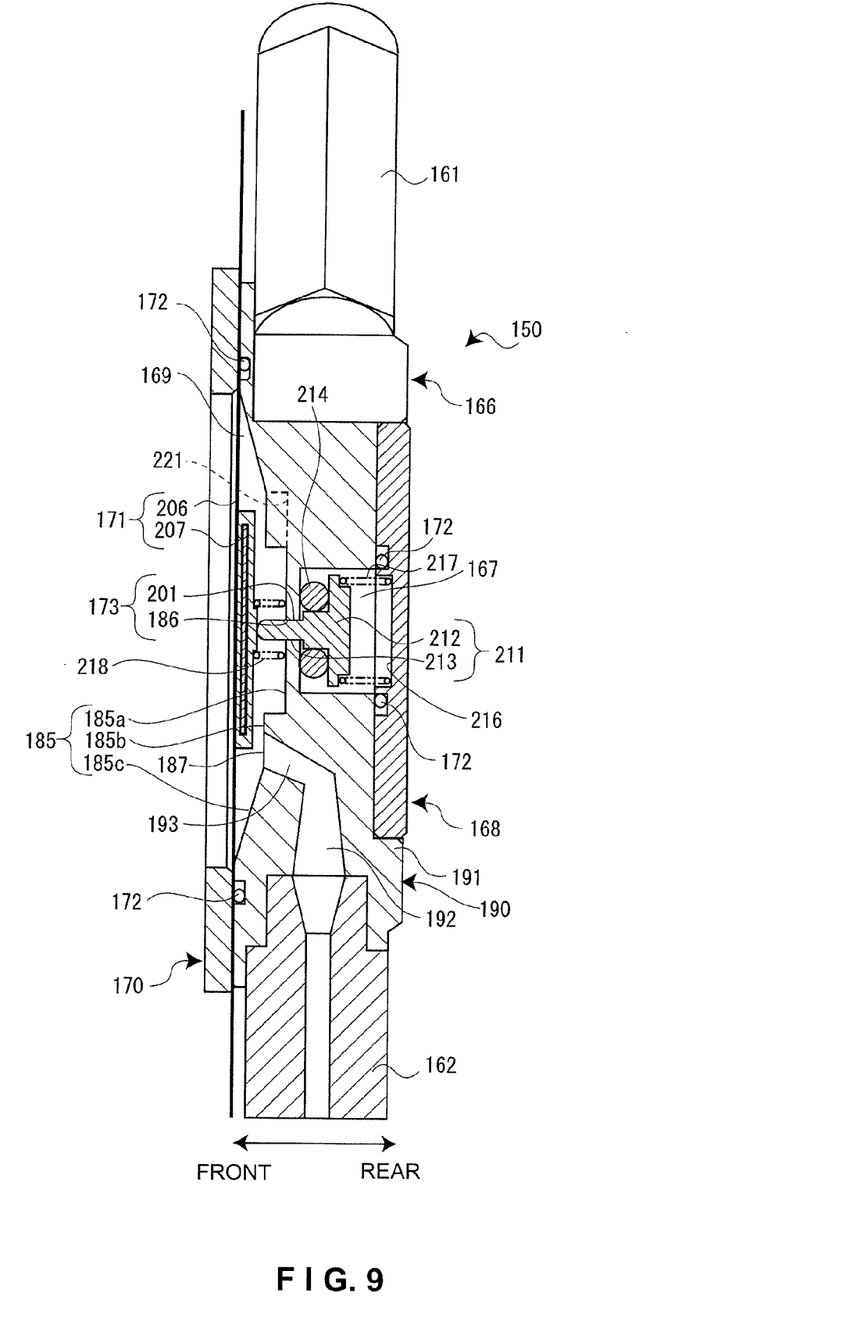
FIG. 9 is a longitudinal sectional view showing the pressure-regulating valve cut in the axial direction of the outflow port.

In the pressure-regulating valve 150 as shown in FIGS. 7 and 8, a valve casing (valve housing) is formed by the three members that include a main casing 166, a lid casing 168 for forming a primary chamber 167 therein with the main casing 166, and a ring plate 170 for forming a secondary chamber 169 therein with the main casing 166 and fixing a diaphragm (pressure-receiving membrane) 171 to the main casing 166, and all of these members are formed of stainless steel or another corrosion-resistant material. A communication flow passage 173 for communicating the primary chamber 167 and the secondary chamber 169 is also formed at the center of the main casing 166.

The lid casing 168 and the ring plate 170 are assembled by stacking the ring plate 170 and the lid casing 168 from the front and rear with respect to the main casing 166 and positioning the lid casing 168 and ring plate 170 using a plurality of shoulder pins (not shown) parallel to each other, and then fastening the lid casing 168 and ring plate 170 with screws, and each has a circular or polygonal (octagonal) outline that is concentric with an axis line that passes through the center of the diaphragm 171. The lid casing 168 and the main casing 166 are placed against each other and bonded in airtight fashion via a gasket 172, and the main casing 166 and the ring plate 170 are placed against each other and bonded in airtight fashion so as to sandwich a gasket 172 and the edge of the diaphragm 171.

The primary chamber 167 formed by the main casing 166 and the lid casing 168 is formed in a substantially cylindrical shape that is concentric with the diaphragm 171, and the open end thereof is covered by the lid casing 168. An inflow port 175 extending at an angle in the radial direction from the primary chamber 167 is formed at the left portion of an upper boss portions formed at the top of the back surface of the main casing 166 on the primary chamber 167 side. The abovementioned inflow connector 161 is connected to the inflow port 175.

As shown in FIG. 8, the inflow port 175 is composed of an inflow hole 176 formed in the external peripheral surface of the main casing 166; a filter housing 177 for housing a filter 181; and an inflow passage 178 for communicating the filter housing 177 and the internal peripheral surface of the primary chamber 167; and the inflow passage 178 is formed off-center on the primary chamber 167 side with respect to the inflow hole 176. The inflow connector 161 is screwed (taper screwed) into the inflow hole 176. A presser bar spring 182 for the filter 181 is accommodated between the filter 181 and the screwed inflow connector 161.

As shown in FIGS. 8 and 9, the secondary chamber 169 is formed in a substantially round truncated conical shape as a whole with the diaphragm 171 as the bottom surface thereof by the diaphragm 171 and an internal wall 185 formed in the main casing 166. The diaphragm 171 is provided in a vertical orientation, and constitutes one surface of the secondary chamber 169. The internal wall 185 includes the surfaces of the secondary chamber 169 other than the surface (one surface) of the diaphragm 171.

The internal wall 185 is composed of a circular flat wall portion 185a that is the apex of the substantially round truncated conical shape, an annular flat wall portion 185b that is connected to the outside of the flat wall portion 185a via a step portion, and an annular tapered wall portion 185c that is connected to the outside of the annular flat wall portion 185b. The secondary-chamber-side opening 186 of the communication flow passage 173 is formed in the center portion of the flat wall portion 185a so as to be concentric with the diaphragm 171, and an outflow opening 187 of an outflow passage 193 described hereinafter is formed in the annular flat wall portion 185b below the secondary-chamber-side opening 186. As described in detail hereinafter, a flow passage groove (extending groove portion) 221 extending upward from the flat wall portion 185a is formed in the annular flat wall portion 185b.

As shown in FIG. 9, the outflow port 190 is formed in an inclined boss portion 191 positioned at the bottom of the main casing 166, and is composed of an outflow hole 192 formed at the bottom of the inclined boss portion 191, the outflow opening 187 of the secondary chamber 169, and the outflow passage 193 for communicating these components. The outflow passage 193 extends at an angle from the annular flat wall portion 185b of the internal wall 185, and is communicated with the downward-oriented outflow hole 192. The outflow connector 162 is screwed into the outflow hole 192 from the axis direction of the outflow passage 193. The functional liquid that flows out from the secondary chamber 169 flows down at an angle along the incline of the outflow passage 193 from the outflow opening 187, and flows out toward the functional droplet ejection heads 17.

As shown in FIGS. 8 and 9, the communication flow passage 173 for communicating the primary chamber 167 and the secondary chamber 169 is formed in the main casing 166. The communication flow passage 173 is composed of a main flow passage 201 and the secondary-chamber-side opening 186 that extends thereto. The primary chamber 167, secondary chamber 169, and communication flow passage 173 each have a circular cross-section that is concentric with the diaphragm 171. However, the main flow passage 201 is composed of a loose shaft insertion portion 202 having a circular cross-section in which a shaft 213 of a valve body 211 described hereinafter is accommodated so as to be able to slide, and a flow passage portion 203 having a cross-shaped cross-section that extends radially in four directions from the loose shaft insertion portion 202 (see FIG. 7(b)).

The diaphragm 171 is composed of a diaphragm body (membrane body) 206 formed from a resin film, and a resin pressure-receiving plate 207 that is bonded to the inside of the diaphragm body 206. The pressure-receiving plate 207 is formed having a circular plate shape concentric with the diaphragm body 206 and having an adequately small diameter in relation to the diaphragm body 206, and the shaft 213 of the valve body 211 described hereinafter makes contact with the center of the pressure-receiving plate 207. The diaphragm body 206 is formed by laminating heat-resistant PP (polypropylene), a specialized PP, and silica-deposited PET (polyethylene terephthalate), and is formed in a circular shape having the same diameter as the front surface of the main casing 166.

The valve body 211 is composed of a circular plate-shaped valve main body 212, a shaft 213 extending in one direction in a sideways T shape in cross-section from the center of the valve main body 212, and an annular O-ring 214 provided (attached) to the proximal end side (valve main body 212 side) of the shaft 213. The valve main body 212 and the shaft 213 are integrally formed of stainless steel or another corrosion-resistant material. The O-ring 214 is formed in an annular shape from a specialized rubber. Therefore, when the valve body 211 is closed, the O-ring 214 is in contact with the edge of the opening of the communication flow passage 173 as the valve seat, and the communication flow passage 173 is sealed in fluid-tight fashion from the primary chamber 167 side.

The shaft 213 is loosely fitted in the (main flow passage 201 of the) communication flow passage 173 so as to be able to slide, and when the valve is closed, the distal end (front end) thereof is in contact with the pressure-receiving plate 207 of the diaphragm 171 in the neutral position. Specifically, when the diaphragm 171 is deformed in the plus direction of swelling toward the outside, a predetermined gap is formed between the front end of the shaft 213 and the pressure-receiving plate 207, and as the diaphragm 171 deforms in the minus direction from this state, the front end of the shaft 213 and the pressure-receiving plate 207 come in contact with each other in a neutral state. As the diaphragm 171 continues to deform in the minus direction, the pressure-receiving plate 207 presses against and opens the valve main body 212 via the shaft 213. Consequently, a volume of functional liquid equal to the portion of the volume of the secondary chamber 169 in which the diaphragm 171 deforms from the plus direction to the neutral state is fed without receiving any of the pressure of the primary chamber 167 side. The diaphragm 171 deformed maximally in the minus direction comes in contact with and conforms to the annular flat wall portion 185b and the annular tapered wall portion 185c (conforming wall portion). Strictly speaking, the diaphragm 171 deformed maximally in the minus direction is provided so that the diaphragm body 206 makes conforming contact with the annular tapered wall portion 185c, and the pressure-receiving plate 207 makes contact with the annular flat wall portion 185b and covers the flat wall portion 185a.

A valve body urging spring 217 for urging the valve body 211 toward the secondary chamber 169; i.e., in the closing direction, is provided between the back surface of the valve body 211 and the wall 216 of the primary chamber 167. A pressure-receiving-plate urging spring 218 for urging the diaphragm body 206 outward via the pressure-receiving plate 207 is also provided between the pressure-receiving plate 207 and the internal wall 185 (flat wall portion 185a). In this configuration, the valve body urging spring 217 supplements the head pressure of the sub tanks 121 that is applied to the back surface of the valve body 211, and the valve body 211 is pushed in the closing direction by the head pressure of the sub tanks 121 and the spring force of the valve body urging spring 217. The pressure-receiving-plate urging spring 218 supplements the plus-direction deformation of the diaphragm 171 and acts to create a negative pressure in the secondary chamber 169 with respect to atmospheric pressure.

The pressure-regulating valve 150 is configured so as to be opened and closed by the deformation (withdrawal) of the diaphragm 171 (and the valve body 211 in contact therewith) according to the pressure balance between atmospheric pressure and the pressure of the secondary chamber 169 connected to the functional droplet ejection heads 17, and so as to reduce the pressure of the secondary chamber 169 side to a predetermined pressure. Forces are distributed between the valve body urging spring 217 and the pressure-receiving-plate urging spring 218, and the valve body 211 is opened and closed extremely slowly by the (elastic force of the) specialized rubber O-ring 214. Pressure fluctuation (cavitation) due to opening and closing of the valve body 211 is therefore suppressed, and ejection by the functional droplet ejection heads 17 is unaffected.

Figure 10:
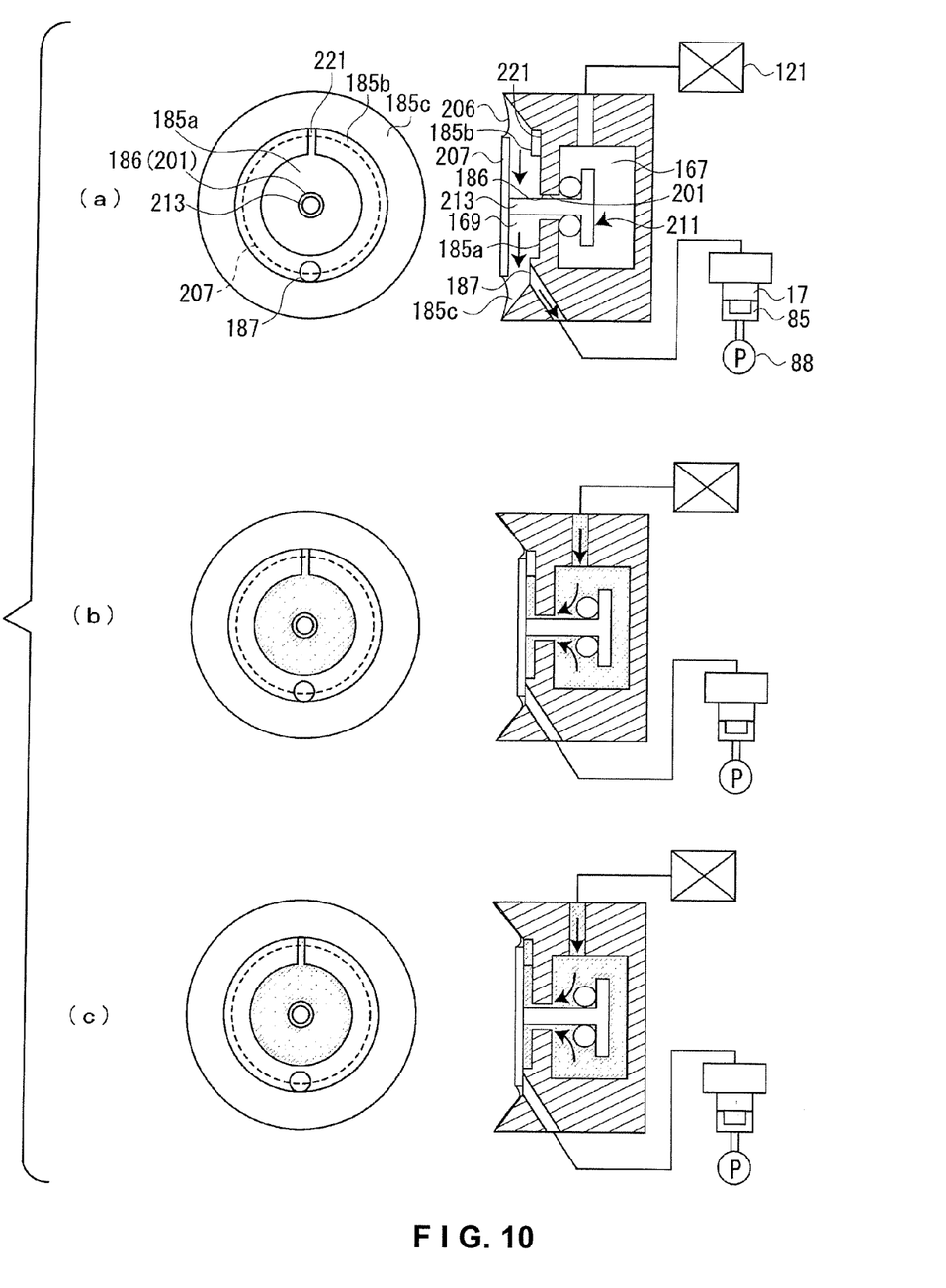
FIG. 10 is a view showing the beginning half of the initial filling operation.

The flow passage groove 221 formed in the internal wall 185 (annular flat wall portion 185b) of the secondary chamber 169 will next be described with reference to FIG. 10. As shown in FIG. 10, the flow passage groove 221 is a linear groove that extends upward in the vertical direction from the flat wall portion 185a, and is rectangular in cross-section. Strictly speaking, the flow passage groove 221 is cut into the annular flat wall portion 185b and extends from the flat wall portion 185a so as to traverse the annular flat wall portion 185b in the radial direction. The flow passage groove 221 is mostly covered by the diaphragm 171 (primarily the pressure-receiving plate 207) deformed maximally in the minus direction, and thereby functions as a flow passage for functional liquid or air. The flow passage groove 221 extends to a position past the external peripheral end of the pressure-receiving plate 207 from the secondary-chamber-side opening 186, and a flow passage is always maintained therein even when the flat wall portion 185a is covered by the pressure-receiving plate 207 of the diaphragm 171 deformed maximally in the minus direction.

The operation for initial filling of the functional liquid will next be described with reference to FIGS. 10 and 11. In the operation for initial filling of the functional liquid, functional liquid is passed from the sub tanks 121 in a state in which the functional droplet ejection heads 17 are suctioned by the abovementioned suction unit 15, and functional liquid is filled through the functional liquid flow passages from the sub tanks 121 to the functional droplet ejection heads 17.

Figure 11:
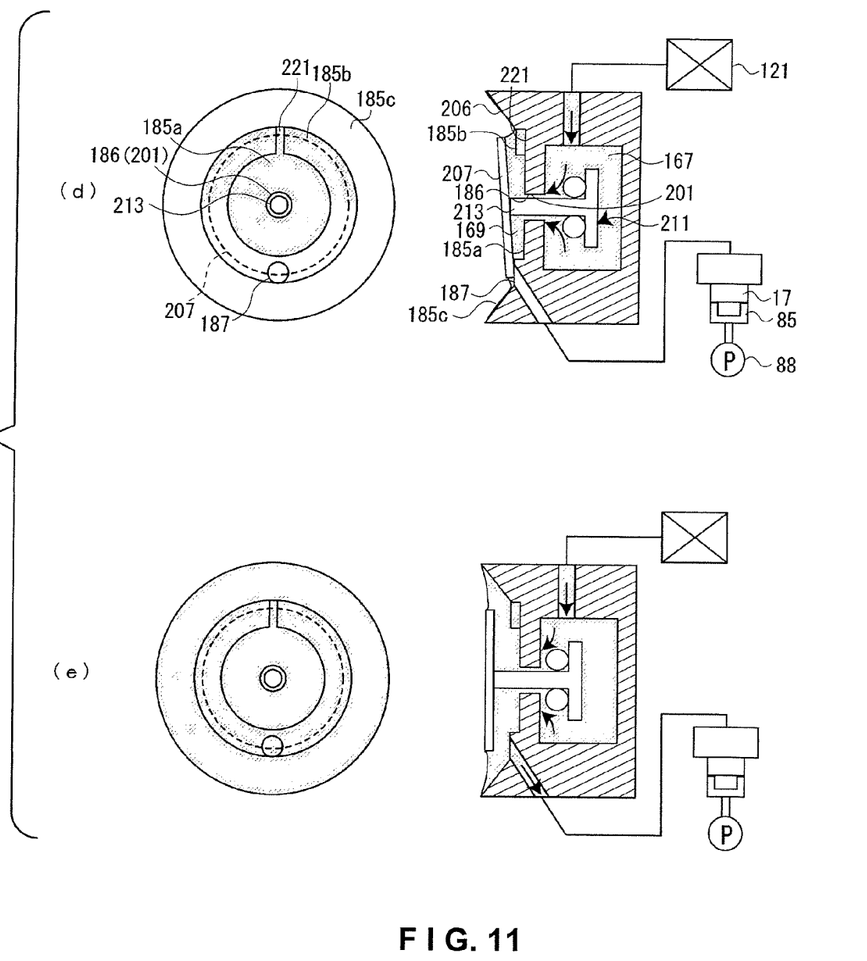
FIG. 11 is a view showing the ending half of the initial filling operation.

As shown in FIGS. 10 and 11, the operation for initial filling of the functional liquid is started by driving the suction mechanisms 88 and suctioning the heads after the head caps 85 have been pressed against the functional droplet ejection heads 17. When head suction is initiated, the air inside the secondary chamber 169 of the pressure-regulating valve 150 is discharged (air release) from the outflow opening 187 (see FIG. 10(a)). The inside of the secondary chamber 169 thereby attains a negative pressure (predetermined operating pressure) in relation to atmospheric pressure, the diaphragm 171 is pressed by atmospheric pressure and deformed in the minus direction (deformed maximally in the minus direction) so as to make contact with the internal wall 185 of the secondary chamber 169. Strictly speaking, in the diaphragm 171 deformed maximally in the minus direction, the diaphragm body 206 thereof makes conforming contact with the annular tapered wall portion 185c, and the pressure-receiving plate 207 makes contact with the annular flat wall portion 185b. As a result, the diaphragm 171 deformed in the minus direction covers the flat wall portion 185a and most of the flow passage groove 221. The valve body 211 is pushed at the same time by the pressure-receiving plate 207, and opens the pressure-regulating valve 150.

In this open state, the air inside the primary chamber 167 and the communication flow passage 173 is discharged from the outflow port 190 via the inside of the secondary chamber 169, and the inside of the primary chamber 167 and communication flow passage 173 is filled with functional liquid. Functional liquid also flows into and fills an inflow space formed between the flat wall portion 185a and the pressure-receiving plate 207 from the secondary-chamber-side opening 186 (see FIG. 10(b)).

Once the inflow space described above has filled, the functional liquid flows into the upwardly extending flow passage groove 221 (see FIG. 10(c)). When the inside of the flow passage groove 221 is filled, the pressure due to the functional liquid inside the inflow space and the flow passage groove 221 increases. As a result, overcoming atmospheric pressure, the pressure-receiving plate 207 is pushed out and continues to retreat (see FIG. 11(d)). Since the center of pressure at this time is shifted upward in the vertical direction from the center of the pressure-receiving plate 207 by the flow passage groove 221, the pressure-receiving plate 207 retreats in slanted fashion. Specifically, as the functional liquid flows into the secondary chamber 169, the diaphragm 171 begins to retreat from the top portion thereof until the entire diaphragm 171 retreats. The flow of liquid into the secondary chamber 169 thereby spreads to the top portion via the flow passage groove 221, and then circulates to the entire secondary chamber 169 and flows into the outflow port 190. The entire pressure-regulating valve 150 is thereby filled with functional liquid (see FIG. 11(e)).

Through a configuration such as described above, the liquid that flows into the secondary chamber 169 from the secondary-chamber-side opening 186 is filled from the top of the secondary chamber 169 by the upwardly extending flow passage groove 221. The liquid can thereby be made to circulate throughout the secondary chamber 169. Adverse effects on pressure regulation by the pressure-regulating valve 150 are therefore eliminated.

The diaphragm 171 deformed maximally in the minus direction is also provided so that the diaphragm body 206 makes conforming contact with the annular tapered wall portion 185c, and the pressure-receiving plate 207 makes contact with the annular flat wall portion 185b and covers the flat wall portion 185a. The pressure-receiving plate 207 can thereby be formed relatively large, the practical pressure-receiving surface area can be enlarged, and an initial inflow space for the liquid can be formed in the flat wall portion 185a. It is therefore possible to effectively prevent a situation in which the diaphragm body 206 adheres over a wide area to the internal wall 185 of the secondary chamber 169, and initial suction of air from the primary chamber 167 is impossible when the diaphragm 171 is deformed maximally in the minus direction during initial filling. The liquid can therefore be made to reliably circulate throughout the secondary chamber 169 from the upper portion thereof.

The outflow opening 187 is preferably formed in a position in which a portion thereof is covered by the pressure-receiving plate 207 of the diaphragm 171 deformed maximally in the minus direction, so that the flow passage of the outflow opening 187 is not blocked by the diaphragm 171 deformed maximally in the minus direction, as shown in FIGS. 7 through 11.

The pressure-regulating valve 150 of the present invention is applied to a liquid droplet ejection apparatus 1 in the present embodiment, but the pressure-regulating valve 150 described above may also be provided to a carriage inspection device for performing various inspections for each of the carriage units 51, for example.

What is claimed is:

1. A pressure-regulating valve for opening and closing a valve body provided to a communication flow passage via which a primary chamber and a secondary chamber communicate inside a valve housing, with the aid of a pressure-receiving membrane that constitutes one surface of the secondary chamber, for regulating the pressure of a liquid fed to the primary chamber via an inflow port, and feeding the liquid from the secondary chamber via an outflow port, wherein an internal wall of the secondary chamber facing the one surface comprises:
  a flat wall portion with a secondary-chamber-side opening of the communication flow passage being formed in the center portion thereof;
  a conforming wall portion with which the pressure-receiving membrane makes conforming contact upon being deformed, the conforming wall portion including an annular flat wall portion and an annular tapered wall portion with the annular flat wall portion being connected to the outside of the flat wall portion via a step portion, the annular tapered wall portion being connected to the outside of the annular flat wall portion, and the annular flat wall portion having an outflow opening communicated with the outflow port formed at the bottom of the conforming wall portion; and
  an extending groove portion extending upward from the flat wall portion to cut into the conforming wall portion so as to traverse the annular flat wall portion in a radial direction.

2. The pressure-regulating valve according to claim 1, wherein the pressure-receiving membrane includes a film-shaped membrane body and a pressure-receiving plate concentrically provided over a wide area in the center portion of the membrane body, and the pressure-receiving membrane, upon being deformed, is arranged so that the membrane body makes conforming contact with the annular tapered wall portion, and the pressure-receiving plate makes contact with the annular flat wall portion and covers the flat wall portion.

3. The pressure-regulating valve according to claim 1, wherein the pressure of a functional liquid fed from functional liquid feeding means via the inflow port is regulated, and the functional liquid is fed to an inkjet-type functional droplet ejection head via the outflow port.

4. A liquid droplet ejection apparatus comprising:

the pressure-regulating valve according to claim 3;

the functional liquid feeding means; and the functional droplet ejection head, wherein the functional liquid is ejected onto a workpiece and drawing is performed while the functional droplet ejection head is moved relative to the workpiece.

\* \* \* \* \*